United States Patent [19]

Sugahara et al.

[11] 4,450,885
[45] May 29, 1984

[54] PROCESS FOR PREPARATION OF GRANULES OF LOW-MELTING-POINT METALS

[75] Inventors: Yujiro Sugahara, Tokyo; Hiroyuki Naito, Tsuruoka; Akira Takahashi, Tsuruoka; Manshiro Hasegawa, Tsuruoka; Hisashi Tsuchida, Tsuruoka, all of Japan

[73] Assignee: Mizusawa Kagaku Kogyo Kabushiki Kaisha, Osaka, Japan

[21] Appl. No.: 958,486

[22] Filed: Nov. 7, 1978

[30] Foreign Application Priority Data

Nov. 12, 1977 [JP] Japan .................................. 52-135907

[51] Int. Cl.³ .............................................. B22D 23/08
[52] U.S. Cl. ...................................................... 164/47
[58] Field of Search ...................... 164/47, 81, 48, 49, 164/71; 269/5, 9, 10, 12, 13, 14

[56] References Cited

U.S. PATENT DOCUMENTS

| | | | |
|---|---|---|---|
| 1,960,492 | 5/1934 | Kahn | 222/196.1 |
| 2,193,664 | 3/1940 | Balder et al. | 264/13 |
| 3,719,732 | 3/1973 | Diffenbach et al. | 264/9 |
| 3,719,733 | 3/1973 | Rakestraw et al. | 264/12 X |
| 3,840,623 | 10/1974 | Olsson et al. | 264/12 |

Primary Examiner—Gus T. Hampilos
Attorney, Agent, or Firm—Sherman & Shalloway

[57] ABSTRACT

A process for the preparation of granules of low-melting-point metals which comprises spouting a melt of a low-melting-point metal in the form of fine streams in a gas phase under melt fracture-causing conditions and introducing the fine streams of the molten metal into a collecting liquid phase so that the speed of the molten metal fine streams just above the liquid face is 50 to 300 cm/sec is disclosed. According to this process, granules having a substantially spherical shape and being uniform in the size can be prepared very easily at high efficiency.

4 Claims, No Drawings

PROCESS FOR PREPARATION OF GRANULES OF LOW-MELTING-POINT METALS

BACKGROUND OF THE INVENTION (1) Field of the Invention

This invention relates to a process for the preparation of granules of low-melting-point metals. More particularly, the invention relates to a process in which substantially spherical granules having a very fine particle size and being uniform in the size are prepared from low-melting-point metals such as lead at high productivity and efficiency.

(2) Description of the Prior Art

As one of conventional methods for preparing metal oxides from low-melting-point metals such as lead, there is known a method in which a metal is first shaped in granules and the granular metal is then oxidized in an oxidizing atmosphere. For example, in the industrial manufacture of lead monoxide, there has been adopted a process in which a melt of metallic lead is cast-molded in granules having a relatively large diameter by using a casting mold, the lead granules are caused to fall in contact with air under friction in a tube mill to peel off a partially oxidized product, namely so-called lead suboxide, from the surfaces of the lead granules, and the so separated lead suboxide is oxidized in another reaction vessel to form lead monoxide.

This casting process, however, is very low in the operation efficiency and is defective in that prepared metal granules are limited to those having a relatively large diameter.

We previously found that when granules of metallic lead, a liquid medium and gaseous oxygen are charged in a rotary mill and this rotary mill is rotated under such conditions that at least parts of the metallic lead granules wetted with the liquid medium are located in the gas phase above the level of the liquid medium and friction is caused among the metallic lead granules through the liquid medium, there can be obtained a dispersion of ultrafine particles of lead monoxide in the liquid medium according to ordinary operation procedures.

In practising this novel process, from the viewpoint of increase of the speed of formation of lead monoxide, namely the oxygen absorption speed, it is necessary that metal granules used in this process should have a relatively small particle size. Further, in order to perform friction effectively among the particles and peel the lead oxide layer formed on the surfaces of the metal granules efficiently, it is preferred that the starting granules be substantially spherical.

As means for preparing granules from molten metals, there has broadly been adopted the spray granulation process in addition to the above-mentioned casting process. However, when a metal having a relatively high melting point and a large melting latent heat is treated according to this process, the molten metal is solidified in the fibrous form and hence, it is difficult to obtain granules having a substantially spherical shape and substantially uniform in the size according to this process.

BRIEF SUMMARY OF THE INVENTION

As a result of researches made by us, it was found that metal granules having a substantially spherical shape and being substantially uniform in the size which is relatively small can easily be prepared at a high efficiency according to the following novel process.

More specifically, in accordance with this invention, there is provided a process for the preparation of granules of low-melting-point metals which comprises spouting a melt of a low-melting-point metal in the form of fine streams in a gas phase under melt fracture-causing conditions and introducing the fine streams of the molten metal into a collecting liquid phase so that the speed of the molten metal fine streams just above the liquid face is 50 to 300 cm/sec.

DETAILED DESCRIPTION OF THE PREFERRED EMBODIMENTS

By the term "low-melting-point metal" used in the instant specification and claims is meant a metal having a melting point not higher than 650° C. For example, the following metals are preferably used in this invention.

| Metal | Melting Point (°C.) |
|---|---|
| Zinc | 419.5 |
| Cadmium | 321.03 |
| Tin | 231.91 |
| Lead | 327.3 |

According to the process of this invention, such low-melting-point metal is molten and spouted in a gas phase in the form of fine continuous or discontinuous streams. At this step, if the temperature of the molten metal is too low, the melt is readily solidified in a yarn-like shape. On the other hand, if the temperature of the melt is too high, the resulting solid has a shape resembling an open flower. Accordingly, at too low a temperature or too high a temperature, it is difficult to obtain granules having a substantially spherical shape. Therefore, it is ordinarily important that the temperature of the melt should be higher by 20° to 150° C., especially by 50° to 100° C., than the melting point of the metal.

Ordinarily, satisfactory results can be obtained when air is used as the gas phase in which the molten metal is spouted. In order to prevent oxidation of the metal, however, there is preferably employed an atmosphere of a non-oxidizing gas such as nitrogen, carbon dioxide gas or argon. Further, in order to maintain a high temperature in the gas phase, it is possible to use a combustion gas or steam atmosphere.

Various extrusion mechanisms may be adopted for spouting the molten metal in the form of fine streams into the gas phase. For example, there can be used a fixed nozzle having a plurality of extrusion openings, a rotary disc having a plurality of extrusion openings, and a rotary member having a number of extrusion openings formed on the peripheral wall face. It is preferred that the amplitude of the diameter of the extrusion nozzle opening be 0.05 to 8 mm, especially 0.5 to 5 mm, though the preferred diameter of the nozzle opening differ to some extent depending on the diameter of the final product granules.

In this invention, in order to obtain substantially spherical granules, it is important that the molten metal should be spouted in the form of fine streams in a gas phase atmosphere under melt fracture-causing conditions. In the instant specification and claims, by the term "melt fracture" is meant a phenomenon in which shocks are given to a molten metal and continuous fine streams comprising large-diameter and small-diameter portions appearing alternately are formed or in an extreme case, the molten metal is spouted in discontinuous streams comprising lines of independent drops.

In the filed of melt extrusion of plastics, this phenomenon of melt fracture is known as the phenomenon in which an extrudate having a varying diameter is formed under application of abnormal increase of the shearing force.

According to this invention, by skillfully utilizing this phenomenon of melt fracture for spouting of the molten metal, granulation of the molten metal can be remarkably facilitated.

Shocks causing the melt fracture may be applied either from the outside or from the inside. For example, when vibrations are given to molten metal extrusion openings maintained at a relatively high temperature, the above-mentioned melt fracture can easily be caused by shocks owing to the vibrations.

More specifically, when vibrations of a predetermined frequency are given to the extruding portion, an apparent or latent fracture is generated at a frequency corresponding to the vibration frequency. Accordingly, in this embodiment of the process of this invention, the number of granules or latent granules to be formed per unit time can be controlled based on the frequency of applied vibrations and the number average diameter of the resulting granules can be foreseen from this number of the granules to be formed and the diameter and spouting speed of the fine streams of the spouted molten metal.

Vibrations may be given in an optional direction to the extruding portion. However, since the component of vibrations acting in a direction parallel to the spouting direction of the melt is effective for causing melt fracture, it is preferred that vibrations be given in a direction parallel to the spouting direction.

The frequency of vibrations is appropriately chosen within a range of from 5 to 5000 Hz, especially from 10 to 500 Hz, depending on the desired diameter of the granules. When the vibration frequency is below the above range, the operation efficiency is low, and when the vibration frequency is above this range, it often happens that the melt fracture is not effectively generated even at such a high frequency.

Instead of the above-mentioned embodiment where the particle size is controlled based on the vibration frequency, there may be adopted an embodiment in which an ordinary alternating current power source of 50 Hz or 60 Hz is employed and the extrusion opening diameter or the extrusion speed is controlled so as to attain a desired particle size.

It is ordinarily preferred that the amplitude of the applied vibrations be 0.05 to 5 mm, especially 0.1 to 3 mm. When the amplitude is below the above range, it often happens that only a yarn-like product or a product of coarse granules having an indefinite shape is obtained, and when the vibration amplitude is too large beyond the above range, it often happens that only granules having a coarse size and an indefinite shape are obtained.

Internal application of melt fracture-causing shocks may be accomplished by generating a melt fracture-causing shearing force between molten metal streams and extrusion nozzle openings by application of a high extrusion pressure to the molten metal or the like means.

According to the process of this invention, the so formed fine streams of the molten metal are introduced into a collecting liquid so that the speed of the molten metal streams just above the liquid face is 50 to 300 cm/sec, especially 70 to 200 m/sec, whereby granules of the metal are obtained. Thus, fine streams spouted under the above-mentioned melt fracture-causing conditions, namely continuous streams comprising small-diameter and large-diameter portions appearing alternately or discontinuous fine streams comprising lines of independent drops, are caused to impinge against the liquid face at the above-mentioned speed, whereby substantially spherical granules are formed.

When the speed of the fine streams is too high beyond the above range, the resulting granules come to have a plate-like shape or voids are formed in the interior, and it is difficult to obtain substantially spherical granules. When the speed of the fine streams is too low below the above range, long tails shape are readily formed on the granules or only a product having a continuous shape is obtained.

For introduction of the molten metal fine streams into the collecting liquid phase, a receiving tank filled with a collecting liquid is disposed below the extruding portion and the molten metal fine streams are guided and conducted into the collecting liquid by the action of gravity. In this case, by adjusting the distance between the extruding portion and the collecting liquid, namely the vertical distance, the impinging speed of the molten metal streams against the liquid face can be controlled.

A most easily available collecting liquid is water, but liquid media having a higher boiling point, such as aromatic solvents and chlorinated hydrocarbon solvents can also be used. The collecting liquid has the function of cooling the introduced molten metal drops while rectifying the shape of the drops to a substantially spherical shape. When the temperature of the collecting liquid is too low, tails are readily formed on the resulting granules. Therefore, it is ordinarily preferred that the collecting liquid be maintained at a higher, i.e., at least 90° C. temperature, for example, 90° C. or higher.

Metal granules deposited in the bottom portion of the liquid phase are withdrawn intermittently or continuously, and they are dried according to need.

In this invention, substantially spherical metal granules having a number average diameter of 0.2 to 10 mm, especially 0.5 to 7 mm, can be prepared according to the above-mentioned procedures, and the particle size of the granules can be controlled in an optical range by appropriately adjusting the diameter of the spouted streams, the spouting speed and the vibration frequency.

Metal granules prepared according to the process of this invention are are very valuable as starting materials to be used for production of metal oxides, and further, they can be advantageously used for production of weights, shots and the like and as radioactive ray shielding fillers.

The process of this invention will now be described in detail by reference to the following Examples that by no means limit the scope of the invention.

EXAMPLE 1

An ingot of metallic lead was charged in a melting furnace, and metallic lead was molten. In order to prevent clogging of extrusion openings, lead oxides floating on the surface of the melt were removed by a ladle.

An extruding vessel connected to a vibrator and having in the bottom portion thereof 16 orifices having a diameter of 1 mm was disposed above the liquid level of a water-filled tank. The molten metallic lead was introduced into the extruding vessel and the metallic lead melt was caused to naturally flow out from the orifices into water in the tank under the following conditions:
  Temperature of melt in extruding vessel: 450° C.
  Vibration frequency of vibrator: 50 Hz
  Vibration direction: vertical direction
  Vibration amplitude: 0.5 mm
  Distance between orifices and water level: 4 cm
  Impinging speed of melt against liquid face: 88 cm/sec
  Water temperature: 90° C.

Thus, metallic lead granules having a number average particle size of about 3 mm, being uniform in the size and having a substantially spherical shape were obtained at a rate of 52.8 Kg/min. Formation of tails was not observed in the so formed metallic lead granules.

COMPARATIVE EXAMPLE 1

Procedures of Example 1 were repeated under the same conditions except that the vibrator was not operated. The shaped product recovered in water in the tank had a thread-like shape and formation of granules was not observed at all.

COMPARATIVE EXAMPLE 2

Procedures of Example 1 were repeated under the same conditions except that the distance between the orifices and the water level was changed to 1 cm (the impinging speed against the water face was 44 cm/sec) or 100 cm (the impinging speed against the water face was 443 cm/sec).

In the former case, the shaped product collected in water in the receiving tank was composed mainly of shortly cut knotted yarn-like pieces, and in the latter case, formation of granules was observed but most of them had a plate-like shape and hollow granules were included.

EXAMPLE 2

In this Example, the influences of the temperature of the molten metal on the shape of granules are illustrated.

Procedures of Example 1 were repeated under the same conditions except that the temperature of molten lead, the amplitude of vibrations generated by the vibrator and the distance between the orifices and the water face were changed as indicated in Table 1. Obtained results are shown in Table 1.

TABLE 1

| Run No. | Temperature (°C.) of Molten Lead | Vibration Amplitude (mm) | Distance (cm) between Orifices and Water Face | Impinging Speed (cm/sec) against Water Face | Shape of Product | Number Average Diameter (mm) | Dtandard Deviation Value (δ) of Diameter Dispersion |
|---|---|---|---|---|---|---|---|
| 1 | 360 | 0.5 | 4 | 88 | smooth yarn-like | — | — |
| 2 | 360 | 3.5 | 10 | 140 | short knotted yarn-like | — | — |
| 3 | 360 | 3.5 | 20 | 198 | substantially spherical | 2.8 | 3 |
| 4 | 410 | 1.0 | 4 | 88 | substantially spherical | 3.5 | 4 |
| 5 | 410 | 2.0 | 10 | 140 | substantially spherical | 4.0 | 4 |
| 6 | 410 | 5.0 | 20 | 198 | substantially spherical | 4.2 | 5 |
| 7 | 450 | 0.2 | 3 | 76 | substantially spherical | 4.4 | 4 |
| 8 | 450 | 1.0 | 10 | 140 | indefinite | — | — |
| 9 | 450 | 1.0 | 20 | 198 | open flower-like | — | — |

From the results shown in Table 1, it will readily be understood that even if the temperature of molten lead is low, by increasing the vibration amplitude, it is made possible to generate melt fracture effectively in the melt, and by adjusting the impinging speed against the water face to a relatively high level, it is made possible to obtain substantially spherical granules. It will also be understood that even if the temperature of molten lead is high, by maintaining a relatively small amplitude in the applied vibrations and controlling the impinging speed against the water face to a relatively low level, it is made possible to prepare substantially spherical granules.

EXAMPLE 3

Procedures of Example 1 were repeated under the same conditions except that metallic zinc, metallic tin or hard lead (consisting of 96% of Pb and 4% of Sb) was used instead of metallic lead and the temperature of the melt was changed as in Table 2. Obtained results are shown in Table 2.

TABLE 2

| Run No. | Metal | Temperature (°C.) of Melt | Shape of Product | Number Average Diameter (mm) |
|---|---|---|---|---|
| 1 | Zinc | 470 | substantially spherical | 4.7 |
| 2 | tin | 280 | substantially spherical | 5.2 |
| 3 | hard lead | 450 | substantially spherical | 3.6 |

What is claimed is:
1. A process for the preparation of granules of low-melting-point metals which comprises

(I) spouting a melt of a low-melting-point metal at a temperature 50° to 100° C. higher than the melting point of said metal in the form of fine streams through extrusion nozzle openings into a gas atmosphere, (II) vibrating the extrusion nozzle openings in a direction parallel to the spouting direction under melt fracture-causing conditions such that the molten metal is spouted in continuous streams comprising large-diameter and small-diameter portions appearing alternatively, and (III) allowing the fine streams of the molten metal to fall into a collecting cooling liquid at a speed of 50 to 300 cm/sec at the position just above the surface of said collecting liquid thereby to rectify the shape of the drops to a substantially spherical shape and to cool the drops.

2. A process according to claim 1 wherein the collecting liquid is water and the water is maintained at a temperature of at least 90° C.

3. The process according to claim 1 wherein the low-melting-point metal is lead.

4. A process according to claim 1 wherein the melt of the low-melting-point metal is maintained at a temperature higher by 20° to 100° C. than the melting point thereof.

* * * * *